United States Patent [19]

Karnick

[11] 4,240,302
[45] Dec. 23, 1980

[54] GYROSCOPIC INSTRUMENT

[75] Inventor: Hartmut Karnick, Kiel, Fed. Rep. of Germany

[73] Assignee: Anschütz & Co., G.m.b.H., Fed. Rep. of Germany

[21] Appl. No.: 847,734

[22] Filed: Nov. 2, 1977

[51] Int. Cl.³ .......................... G01C 19/30; G01P 3/49
[52] U.S. Cl. ....................................... 74/5.46; 73/504; 73/518; 73/519; 74/5.5
[58] Field of Search ............... 74/5.46, 5.8, 5 F, 5.4, 74/5.41, 5.5; 73/505, 504, 518, 519

[56] References Cited

U.S. PATENT DOCUMENTS

| 2,328,744 | 9/1943 | Roters | 74/5.46 |
|---|---|---|---|
| 2,339,606 | 1/1944 | Sias | 74/5.46 |
| 2,418,032 | 3/1947 | Jewell | 74/5.46 |
| 2,419,063 | 4/1947 | Fischer | 74/5.46 |
| 2,846,207 | 8/1958 | Marggraf | 73/505 |
| 2,968,955 | 1/1961 | Davenport | 74/5.8 |
| 3,025,708 | 3/1962 | Slater et al. | 74/5.46 |
| 3,214,981 | 11/1965 | Cogan | 74/5.4 |
| 3,242,745 | 3/1966 | Romberg | 74/5.46 |
| 3,251,233 | 5/1966 | Duncan et al. | 74/5.46 |
| 3,678,764 | 7/1972 | Erdley et al. | 74/5.6 D |
| 3,832,906 | 9/1974 | Craig | 74/5 F |

Primary Examiner—Rodney H. Bonck
Attorney, Agent, or Firm—Shlesinger, Fitzsimmons & Shlesinger

[57] ABSTRACT

A gyroscopic instrument which may be a compass or a turn-indicator or an artificial horizon includes a gyroscope rotor mounted in a frame for rotation and for universal pivotal motion and provided with a co-axial drum-shaped sleeve of a non-magnetic and electrically conductive material and an annular magnet having a substantially cylindrical air gap and being radially polarized to produce a radial magnetic field in said gap. This magnet is so mounted on the frame as to locate the rotor sleeve within the air gap with a radial clearance affording the rotor pivotal movability relative to the magnet.

15 Claims, 10 Drawing Figures

GYROSCOPIC INSTRUMENT

BACKGROUND AND BRIEF DESCRIPTION OF INVENTION

The present invention relates to a slaving motor which exerts precession moments directly on the rotating rotor of a gyroscope, which moments are controlled by the position of components of the slaving motor in relation to the rotor. The invention also relates to gyroscopes designed to use such a slaving motor.

Slaving motors which act directly on a rotating rotor are of particular importance for gyroscopes whose rotors have three degrees of rotational freedom relative to the fixed parts surrounding them, that is to say gyroscopes in which the rotor is not first of all mounted to rotate about its axis of spin in a first gimbal whose position represents the position of the vector axis which in turn represents the inertial measurement data given by the gyroscope. Among gyroscopes of this kind are those whose rotors are connected by rotating joints to a drive shaft mounted directly in the rotor frame and particularly gyroscopes having rotating resilient joints, which in turn encompass the class of dynamically tuned gyroscopes, which are produced in many forms.

To simplify them and to reduce the number of components and potential sources of error, it is of advantage in certain gyroscopes of which embodiments will be described below, to control the precession moments exerted on the rotor not by the current to the slaving motor but by the position in relation to the gyro-rotor of a magnetic arrangement which is permanently excited or constantly excited over a period of time. This advantage is afforded in particular when a precession moment is to be generated either proportionally to the angular deviation of the rotor relative to the gyro-frame, in which case the magnetic arrangement may be fixed to the frame, or else as a function of the angular position of the rotor relative to the vertical, in which case the magnetic arrangement may be arranged on a component whose position is governed by the force of gravity. The first requirement exists typically in rate of turn gyroscopes and the latter in different figurative forms in compasses and attitude gyroscopes.

It is an object of the invention to provide a position-controlled slaving motor which acts directly on the rotating rotor of a gyroscope and which exerts thereon a precession moment which is determined solely by the angular position in relation to the rotor of a magnetic arrangement surrounding the gyroscope, except for the very slight effects of technical shortcomings, and which makes it possible for the rotor to be simply constructed from totally non-magnetic and non-magnetisable material. The intention is also to achieve the object of coupling this slaving motor to the earth's field of gravity in such a way that the functions of specific kinds of gyroscope, particularly attitude gyroscopes and gyro-compasses, can be performed.

In accordance with the invention this object is achieved by having part of the rotor take the form of a cylindrical drum whose walls are thin in relation to its diameter and which is made of a non-magnetic material which is a good conductor of electricity, and by having the magnetic arrangement which produces the moments of precession take the form of a magnetic ring which extends round the drum from at least one of its ends and which generates an annular magnetic field which is uniform around the circumference of the magnetic ring, which passes through the drum radially, and which extends for a fraction of the length of the rotor drum, preferably with axial symmetry about the centre point of the rotor joint.

In one embodiment of the invention, e.g. for constructing a gyroscope to measure the inertial speed of rotation of the gyro-frame about two axes, such a gyroscope being referred to here as a two-axis rate of turn gyroscope, the magnetic ring is rigidly connected to the rotor frame in a position such that its longitudinal axis coincides with the axis of the drive shaft.

In a second embodiment of the invention, for example for constructing an integrating rate of turn gyroscope having only one sensing axis, which will be referred to here as a single-axis rate of turn gyroscope, the magnetic ring is arranged to be pivotable relative to the gyro-frame about an axis which lies at right angles to the axis of the drive shaft and which preferably passes through the centre point of the joint of the rotor.

In further embodiments for exerting controlled slaving moments on the gyro-rotor the magnetic ring is connected to the rotor frame so as to be able to pivot about more than one axis which lies at right angles to the drive shaft of the rotor and which preferably passes through the centre point of the joint of the rotor, and means are provided to control the position of the magnetic ring relative to the gyro-frame about one or more of its axes or to exert torque on the magnet ring.

In further embodiments for exerting slaving moments on the gyro-rotor as a function of the angular position of the gyro-frame in relation to the vertical, the magnet ring or one or more of the parts by which it is suspended to pivot in the gyro-frame are given deliberate imbalances relative to the axes of pivot of the magnet ring.

To set the slaving moments in desired directions relative to the directions of moments exerted on the magnetic ring, the magnetic ring and the parts by which it is suspended to pivot in the gyro-frame may be provided with resilient return means which exert torques on the magnetic ring as a function of its deviation from its normal position relative to the drive shaft of the gyroscope. Also, to avoid errors arising from friction in and displacement of the pivot bearings, and to simplify the construction of the gyroscope, it is proposed that the pivot bearings and the resilient return means be functionally combined in the form of resilient joints.

Other possible embodiments, the mechanism of operation, the principles of design, and the dimensions of the slaving motor arrangement for performing desired gyroscope functions will be explained with reference to the following embodiments. These are shown in the accompanying drawings in which:

DETAILED DESCRIPTION OF INVENTION

Figure 1:
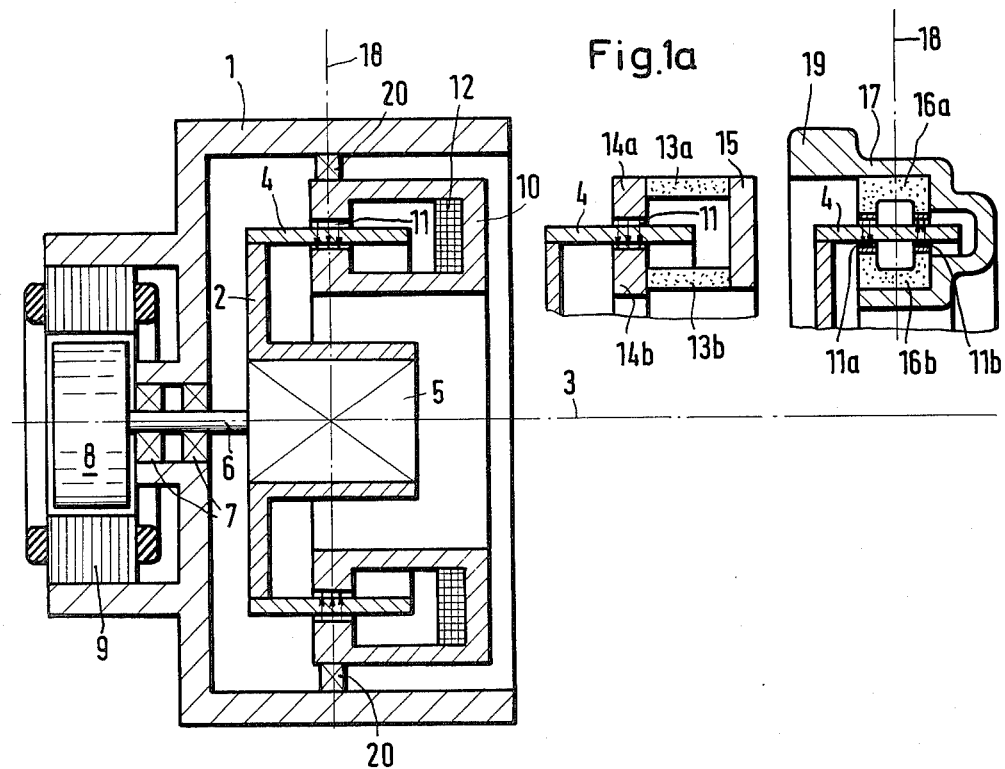
FIG. 1 is an axial section through the gyro-rotor, its bearings, and the frame holding the magnetic ring.

Reference now to the drawings, FIG. 1 is a longitudinal section showing the basic construction of a gyroscope having a position-controlled slaving motor according to the invention. A gyro-shaft 6 is mounted to rotate in the gyroframe 1 in bearings 7. An electric motor which has a rotor 8 and a stator 9 connected to the frame 1 of the gyroscope represents driving means which causes the shaft to rotate at high speed and at its free end the shaft carries a universal joint 5, e.g. a dynamically tunable flexible universal joint, by means of which the rotor 2 is connected to the shaft 6 in such a way that it can pivot about any axis perpendicular to the axis of the shaft 6 while encountering infinitesimal opposing moments. Thus when the shaft 6 is rotating at high speed, the rotor 2 has the characteristics of a free gyroscope. The configuration described here represents only an illustrative embodiment; the invention may equally well be applied to any other arrangements which contain rotors mounted to rotate with three degrees of freedom.

The arrangement used to exert the slaving moments consists on the one hand of a part 4 of the rotor in the form of a drum-shaped sleeve which is made of a non-magnetisable material which is a good conductor of electricity, and on the other of an annular magnet ring 10 surrounding the drum 4, when energised by a current flowing in a winding 12 generates in the air gap a magnetic field 11 which is uniform around its circumference and which passes through the sleeve 4 radially. In the normal position the annular magnet 10 and the rotor 2 are co-axial with one another. The magnetic ring is preferably fitted in such a way that its magnetic field centre plane 18 passes through the point of intersection of the suspension axes of the joint 5.

Figures 1A, 1B:
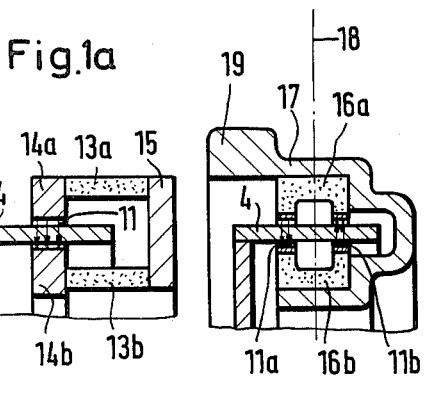
FIG. 1a is a sectional view corresponding to FIG. 1 through another embodiment of magnetic ring.
FIGS. 1b and 1c are two views corresponding to FIG. 1a of further embodiments of the magnetic ring.

FIGS. 1a and 1b show other embodiments of the annular magnet 10 which are energised by permanent magnets. In FIG. 1a, two pole rings 14a and 14b of soft magnetic material from the air gap 11. Following on from them in the axial direction are two axially magnetised permanent magnets 13a and 13b which at the end faces remote from the drum 4 are connected together by a yoke ring 15 to provide magnetic continuity. In FIG. 1b there are two permanent magnets 16a and 16b in the form of rings of U-section and these form two air gaps 11a and 11b in which the sleeve 4 is traversed by two radial magnetic fields lying in opposite directions. The carrier 17 for the magnets 16a and 16b is made of a light material and this and the presence of a counterweight ring 19 enable the whole magnet ring to be balanced relative to the centre plane 18 if required.

Figure 1C:
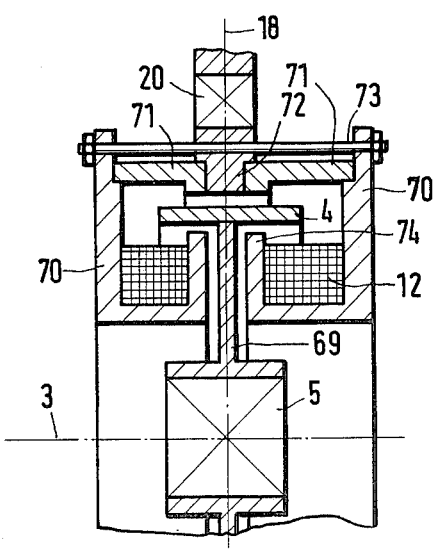

FIG. 1c shows an embodiment of an annular magnet which has a particularly low stray field and which is also of symmetrical construction and allows the rotor to be of axially symmetrical construction and provides very good shielding of the magnetic field of the eddy currents induced in the rotor. In this case the rotor sleeve 4 is connected to the universal joint 5 by a web 69 which lies on the centre plane 18 of the arrangement as a whole. The magnetic ring is made up of two identical rings 70 and 71 which are held together axially by draw bolts 73 for example and which, being so held, clamp in a centre ring 72 which is non-magnetic and serves as a mounting for the magnetic ring, e.g. via joints 20. Windings 12 are provided to produce the magnetic excitation. Instead however, radially magnetised annular permanent magnets could be fitted without any adverse effect on the low stray field of the arrangement as a whole, being fitted in place of the side-pieces 74 for example.

As will appear from the foregoing description, the gyroscopic instrument illustrated in FIG. 1 comprises the frame 1, the gyroscope rotor 2, 4 including the co-axially disposed drum-shaped sleeve 4 of a non-magnetic and electrically conductive material, the means 5 for mounting the rotor 2, 4 within the frame 1 for rotation and for universal pivotal movement about axes including axis 18 intersecting the axis 3 of rotation of the rotor 2, 4, the annular magnet 10 having the substantially cylindrical air gap 11 and being radially polarized to produce the radial magnetic field in the gap 11, and the means 20 on the frame 1 and on the magnet 10 for so mounting the magnet 10 non-rotatably as to locate the sleeve 4 within the air gap 11 with a radial clearance affording the sleeve 4 pivotal movability relative to the magnet 10 about the transverse axes including axis 18. Moreover, the instrument includes the driving means 8, 9 carried by the frame 1 and connected to the rotor 2, 4.

Figures 2A, 2B:
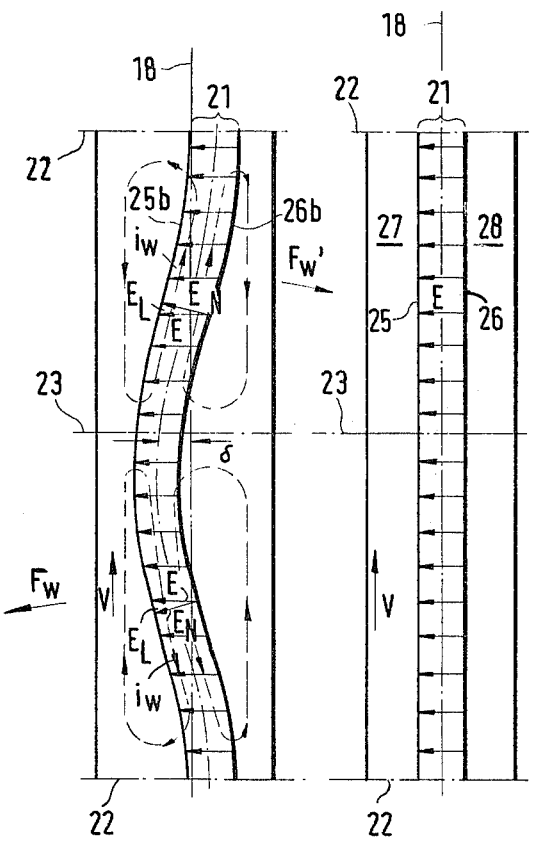
FIG. 2a is a view corresponding to FIG. 2 of the state of the magnetic field when the rotor and the magnetic ring are positioned co-axially.
FIG. 2b is a developed view of the circumference of the rotor shown in FIG. 2 and the magnetic field.
Figure 2:
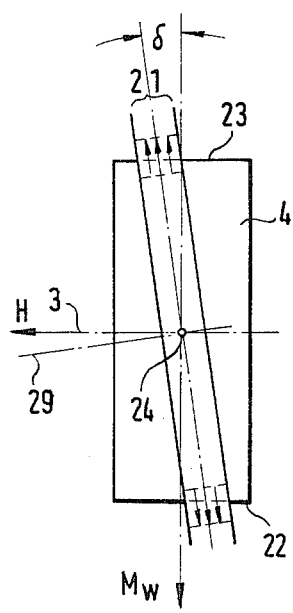
FIG. 2 is a schematic view illustrating the operation of the magnetic ring shown in FIGS. 1, 1a and 1b when in a tilted position.

The way in which the slaving motor operates can be seen from FIGS. 2, 2a and 2b. FIG. 2 is a diagram of the rotor drum 4 and of a zone 21 of the radial magnetic field passing through it. The magnetic ring 10 itself is not shown. In contrast to FIGS. 1 and 1a, in the present case the magnetic field is directed from the inside outwards and zone 21 of the field is shown inclined at an angle of δ to the drum 4. The pivot axis is marked 24. FIGS. 2a and 2b are developed views of the sleeve 4 firstly with no deviation (FIG. 2a) and secondly with deviation (FIG. 2b) of the magnetic ring. The section lines 22 and 23 in FIGS. 2, 2a and 2b correspond to one another. In the developed views in FIGS. 2a and 2b are shown the path of the field zone 21, a vector for the peripheral speed V and illustrative vectors for the strength E of the electrical field induced in the skin of the sleeve. In the case shown in FIG. 2a where there is no divergence, the electrical field strength E is distributed around the periphery of the sleeve symmetrically to the centre plane 18. The boundary lines 25, 26 of field zone 21 are equipotential lines. Since there is no conductive connection between the sections 27 and 28 on the two sides of field zone 21 which circumvents this zone, no current can flow in the sleeve. Neither a braking moment nor a precession moment is produced.

If there is a deviation by the magnetic ring by an angle of δ, the field zone 21 produces in the winding the sinusoidal waveform which is shown in FIG. 2b. The vector of the electrical field strength E is generally no longer at right angles to the boundary lines 25b, 26b of the field zone 21. The boundary lines are not equipotential lines. The field strength E can be broken down into a normal component $E_N$ perpendicular to the boundary lines and a longitudinal component $E_L$ in the direction of the boundary lines. The normal components $E_N$ produce electromotive forces which are virtually the same everywhere around the circumference and thus no current, as in the case of FIG. 2a. The magnitude of the longitudinal components shows a sinusoidal variation around the circumference. In the sleeve they generate eddy currents $i_w$ for which typical paths are shown in broken lines. The parts of the eddy currents which pass through field zone 21 in turn generate, in conjunction with the magnetic field, forces whose resultants in the two halves of the drum are shown as $F_w$ and $F_{w'}$. The vectors $F_w$ and $F_{w'}$, lie at right angles to the boundaries of field zone 21 and at the small angles of deviation permitted in the arrangement embody an infinitesimally small braking component. They operate in an essentially axial direction and together produce a torque $M_w$ which causes the rotor carrying the sleeve 4 to precess with an angular momentum H so that its axis 3 moves towards the axis 29 of the deflected annular magnet. The eddy current torque $M_w$ generated by the magnetic ring thus tends to slave the rotor to the magnetic ring. The torque $M_w$ is proportional to the deviation and the peripheral speed V. The latter interdependence means that the rate of precession $W_P = M_w / H$ is proportional to the speed of rotation of the gyroscope, since H too is proportional to that speed of rotation. If the sleeve is sufficiently long in relation to the width of the magnetic field zone 21, the torque $M_w$ is not affected by small axial shifts of the magnetic field zone 21 in relation to the sleeve. Because of the non-uniformity of the induction in the air gap around the periphery of the sleeve 4 which they involve, radial displacements produce a braking force on the rotor at the point where the induction is at its maximum. Inconsistencies in the geometry of the air gap 11 around the periphery have a similar effect. However, such a local braking force only produces a precession moment for the rotor to the extent that the point at which it is applied lies off the centre plane 18 in which the point of intersection of the axes of the joint 5 lies. Radial displacement of the magnet ring and a non-uniform width of air gap around its circumference thus generate unwanted precession moments only if an axial displacement occurs at the same time, i.e. they are second order sources of error. This means that to a good approximation the object is achieved of providing a position-controlled slaving motor whose slaving moment is determined only by the relative angular position of the magnetic ring and the gyro-rotor and not by translatory shifts.

To slave a gyroscope in practice, the magnetic ring 10 may be arranged to pivot in the gyro-frame 1 about one or two axes via joints 20, and drive means, e.g. servo motors (not shown here) may be provided which allow the magnetic ring 10 to be set to a specific angular position relative to the rotor 2 in order to cause a slaving moment to be generated.

However, gyroscopes which are interesting from the practical point of view because of their simplicity are produced if the magnetic ring 10 is either fitted rigidly in the gyro-frame 1 or else if it is mounted by means of resilient joints 20, to pivot resiliently in the gyro-frame 1 around one or two axes which are perpendicular to the shaft axis 3 and preferably to one another and if, in certain modifications, it is coupled to the earth's field of gravity by an unbalanced weight.

Figure 3:
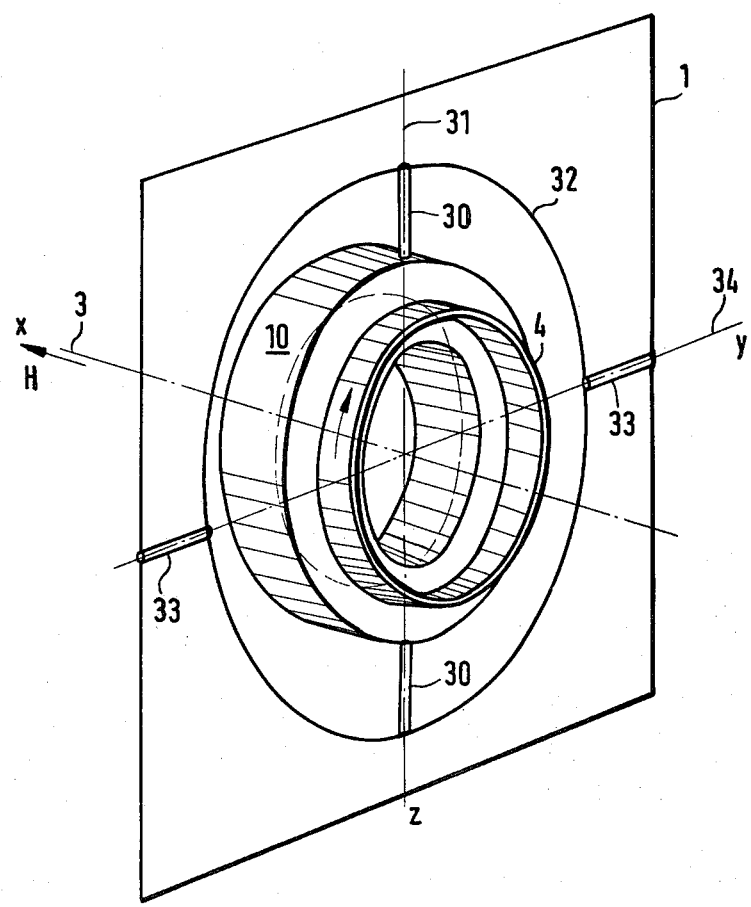
FIG. 3 is a perspective view of a universally tilting mounting for the magnetic ring in the gyro-frame, with the drive to the rotor omitted.

The way in which the modified embodiments so produced operate can best be understood by considering the general view in FIG. 3. In it, 4 represents a rotor sleeve made of an electrically conductive and non-magnetic material which in its normal position rotates in the direction of the arrow about the axis 3. The means used to mount it and drive it, such being for example of the kind represented by the universal joint 5 on the shaft 6, the bearings 7 and the motor 8, 9 shown in FIG. 1, are not shown for the sake of simplicity. The rotor sleeve 4 however can pivot through small angles from its position co-axial with the shaft 3, which is fixed relative to the gyro-frame, without experiencing precession moments as a consequence of this pivoting except any from the magnet ring 10. The magnet ring 10 surrounds the rotor sleeve 4 in a similar way to that shown in FIG. 1. It is mounted by means of two resiliently rotating joints 30 to pivot about an axis 31 in a gimbal ring 32, which in turn is connected to the frame 1 so as to pivot about an axis 34 at right angles to the axes 3 and 31, being so connected by two further resiliently rotating joints 33. The positive directions of the axes 3, 34 and 31 are referred to, as shown in FIG. 3, as x, y, z. For use in describing the operation of this arrangement, the following terms are defined:

H = angular momentum of the rotor and the sleeve 4 as a result of their rapid rotation about the axis shown in the Figures.

$\zeta_y$, $\zeta_z$ = angles of deviation of the rotor drum 4 relative to the gyro-frame 1 about the y and z axes.

$d_y$, $d_z$ = the rotational stiffness of the two rotationally resilient joints 33 and 30 under the deviation of the magnet ring 10 relative to the gyro frame 1 about the y and z axes respectively.

$\omega_y$, $\omega_z$ = rates of precession of the rotor and the rotor sleeve 4 under the angular momentum H about the y and z axes respectively.

$K_w = M_m / \delta$ (referring to FIG. 2), the eddy current factor.

It can be shown that if the rotor sleeve 4 diverges angularly from the gyro frame 1 by angles of $\zeta_y$ and $\zeta_z$, then precession moments act on the rotor sleeve which produce the following rates of precession $$\omega_z = -\frac{K_w}{H} \frac{\zeta_z + \frac{K_w \zeta_y}{d_2}}{1 + \frac{K_w^2}{d_z d_y}} \tag{1}$$

$$\omega_y \quad -\frac{K_w}{H} \frac{\zeta_y - \frac{K_w \zeta_z}{d_y}}{1 + \frac{K_w^2}{d_z d_y}} \tag{2}$$

By making the stiffness ratios $K_w/d_z$ of suitable size and by replacing one or both of the resilient couplings $d_z$, $d_y$ to the frame by appropriate couplings to the earth's field of gravity, gyroscopic functions of different kinds can be achieved. The following examples will make this clear:

A.

$$\left. \begin{array}{c} K_w << d_z \\ \\ K_w << d_y \end{array} \right\} \text{ means that } \left\{ \begin{array}{c} \omega_z \approx -\frac{K_w}{H} \zeta_z \quad (3) \\ \\ \omega_y \approx -\frac{K_w}{H} \zeta_y \quad (4) \end{array} \right.$$

In comparison with the eddy current coupling the resilient constraint on the magnetic ring is stiff. In the extreme case $d_z, d_y \to \infty$, that is to say the magnetic ring 10 is rigidly connected to the gyro frame 1. The rates of precession $\omega_z$, $\omega_y$ are then proportional to the angles of divergence $\zeta_z,\zeta_y$ to a high degree of accuracy or conversely, if, as a result of rotation of the gyro frame 1 relative to the inertial space, rates of precession are imposed on the gyro-rotor, then angles of divergence $\zeta_z,\zeta_y$ proportional to these rates are set up: a device so constructed acts as an inertial rate-of-turn sensor or "rate of turn gyroscope" for the two axes of measurement z and y if the angles of deviation $\zeta_z$ and $\zeta_y$ are measured by the angle pick-offs familiar in gyroscope engineering. The accuracy of measurement $\zeta_z/\omega_{wz} = -H/K_w$ is greater the smaller is the eddy current coupling factor $K_w$. Reductions in this, and thus the accuracy of measurement, are limited in practice by the angles of deviation $\zeta_z,\zeta_y$ permitted at the maximum rates of frame rotation.

B. $d_y \ll K_w \ll d_z$ means
$$\omega_z - \frac{K_w}{H} \frac{\zeta_z}{1 + \frac{K_w^2}{d_z d_y}} \quad (5)$$

$$\omega_y - \frac{K_w}{H} \frac{K_w}{d_y} \frac{\zeta_z}{1 + \frac{K_w^2}{d_z d_y}} \quad (6)$$

Here the one resilient constraint $d_y$ is weak and the other $d_z$ is related to the eddy current coupling. In the extreme case, once again $d_z \to \infty$, i.e. the magnetic ring 10 is identical with the gimbal ring 32 in FIG. 3 and this gives $$\omega_z \frac{K_w}{H} \zeta_z \quad (7)$$

$$\omega_y \frac{K_w}{H} \frac{K_w}{d_y} \zeta_z \quad (8)$$

and hence $$\omega_y \frac{K_w}{d_y} \omega_z \quad (9)$$

Figure 4:
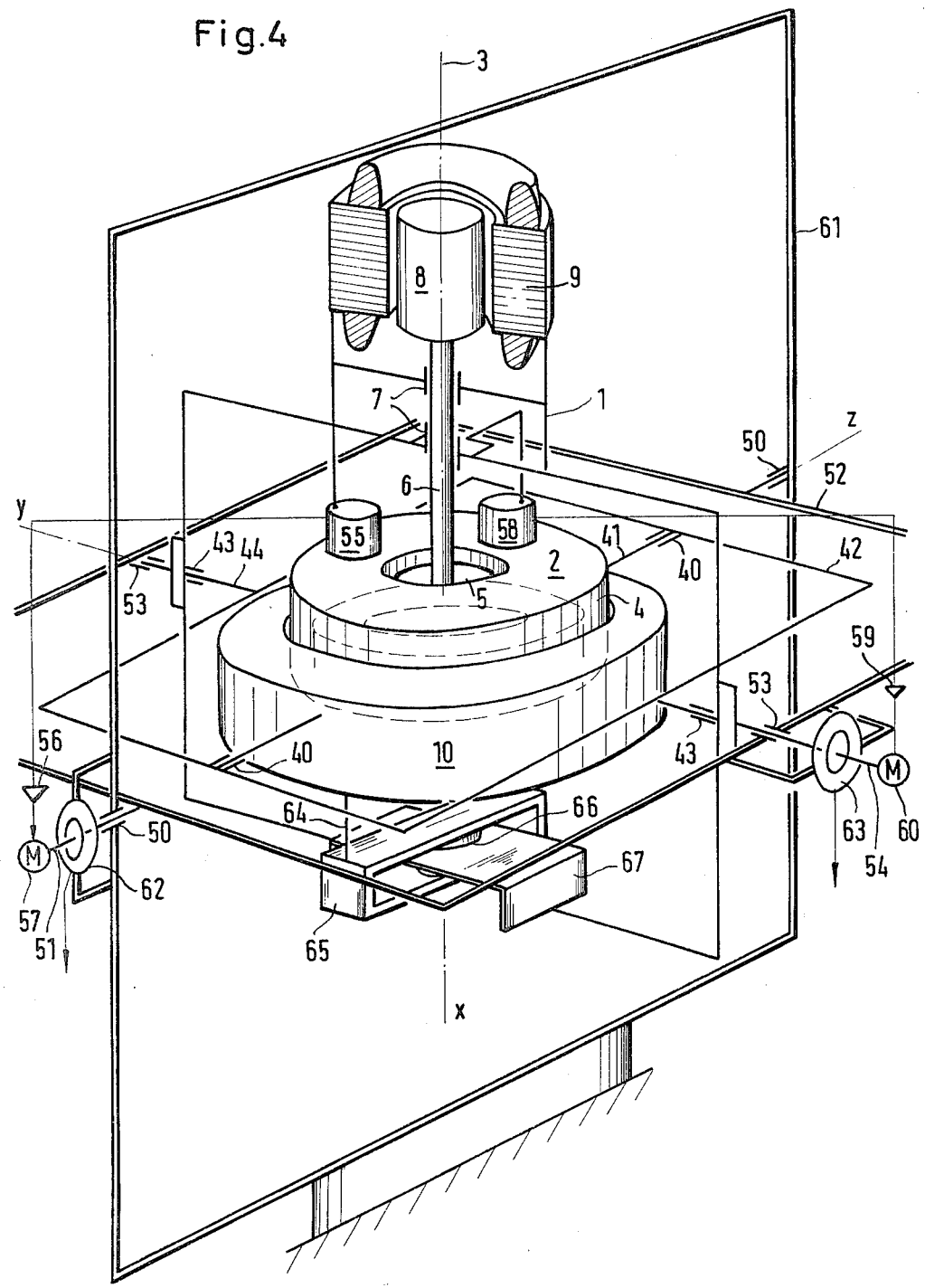
FIG. 4 is a schematic perspective view of a vertical gyroscope formed in accordance with the invention.

If an inertial rate of rotation $\omega_z$ is imparted to the frame 1, then a proportional gyro-deviation $\zeta_z$ is set up and as a result an inertial rate of rotation $\omega_y$ of the rotor around an axis perpendicular to the axis of the initial rotation. This is the characteristic behaviour of an "integrating rate of turn gyroscope". The coefficient $K_w/d_y$ represents its "gyroscopic amplification" C. Construction as a vertical gyroscope as shown in FIG. 4.

C. Construction as a vertical gyroscope as shown in FIG. 4.

The gyroscope is constructed in principle as shown in FIG. 1 but with the drive axis 3 arranged vertically. The gyro-frame 1 is mounted to rotate in the frame 61 of the apparatus about two axes 51, 54 which lie at right angles to each other and, in the normal position, to the axis 3 as well, by means of an intermediate frame 52 and bearings 50, 53 and is continuously made to follow the rotor 2 in a known way by servo motors 57, 60 which are controlled via servo amplifiers 56, 59 from pick-offs 55, 58 for the angular position of the gyro-rotor 2 relative to the gyro-frame 1. Relative to the z and y axes, the position of the gyro-frame 1 thus represents the position of the rotor 2. It can be detected in relation to the position of the frame 61 of the apparatus by angle pick-offs 62, 63 of known construction.

The resilient rotary constraint $d_z$, $d_y$ between the magnetic ring 10 and the gyro-frame 1 in FIG. 3 is here replaced by coupling to the vertical direction determined by the earth's gravitational field, with coupling factors $1_z$, $1_y$. For this purpose the magnetic ring 10 is mounted to rotate in the gyro-frame 1 about axes 41, 44 by means of bearings 40, 43 without opposing resilient moments and its centre of gravity is positioned below the intersection of the axes 41, 44.

To describe the rotor precession in this arrangement, it is necessary in equations (1) and (2) to replace $d_x$, $d_y$ by $1_z$, $1_y$ and the positional angles $\zeta_z$ $\zeta_y$ of the rotor 1 relative to the gyro-frame 1 by the positional angles $\epsilon_z$, $\epsilon_y$ of the rotor 1 relative to the vertical direction.

From this is follows, as in A, that $$\left.\begin{array}{l} K_w \ll 1_z \\ \\ K_w \ll 1_y \end{array}\right\} \text{ means that } \left\{\begin{array}{ll} \omega_z = -\frac{K_w}{H} \epsilon_z & (10) \\ \\ \omega_y = -\frac{K_w}{H} \epsilon_y & (11) \end{array}\right.$$

In case of inclinations $\epsilon_z,\epsilon_y$ of the gyro-rotor to the vertical direction, the coupling of the magnetic ring 10, which is of a pendulous nature, to the vertical allows rates of precession $\omega_z$, $\omega_y$ to be produced so that the angles of inclination $\epsilon_z$, $\epsilon_y$ become smaller. The gyroscope precesses along a straight path to wherever the vertical is at that time. This is the characteristic behaviour of a vertical gyroscope, which is used on moving vehicles or craft to indicate the vertical for instance. The magnitude $H/K_w$ is the time constant of the first order low pass filter which this system represents for horizontal alternating accelerations by the vehicle or craft. In the interests of good filtering of such alternating accelerations it should be made as large as possible. A limit is set by the drift caused by the technical shortcomings of the gyroscope.

Such a long low-pass time-constant also slows down the steadying of such a gyroscope to the vertical direction after switching on. This disadvantage can be overcome by having the magnetic ring 10 energised electromagnetically in the way illustrated in FIG. 1 by a winding 12 whose current is temporarily raised for the steadying period to a multiple of its normal value, which is set for favourable low-pass characteristics.

It is known that a considerable improvement in the low-pass behaviour itself and as regards the steadying period is achieved if a second member of a low-pass nature is inserted in the supports. This can be achieved in the present arrangement by damping the pendulous magnet ring 10. As an example of a damping arrangement, in FIG. 4 a permanent magnet 65 is connected to the magnet ring 10 by struts 64 of which only one is shown, this magnet generating in an air gap 66 a magnetic field parallel to the axis of the magnetic ring 10 shown in the Figure. This field passes through a plate 67 of a non-magnetic material which is a good conductor of electricity, the plate being connected to the lower side of the gyro-frame 1. Instead of this arrangement it is also possible for liquid damping to be used for example, although this has the disadvantage amongst others than when the device is not operating it must not be tilted or turned over.

Figure 5:
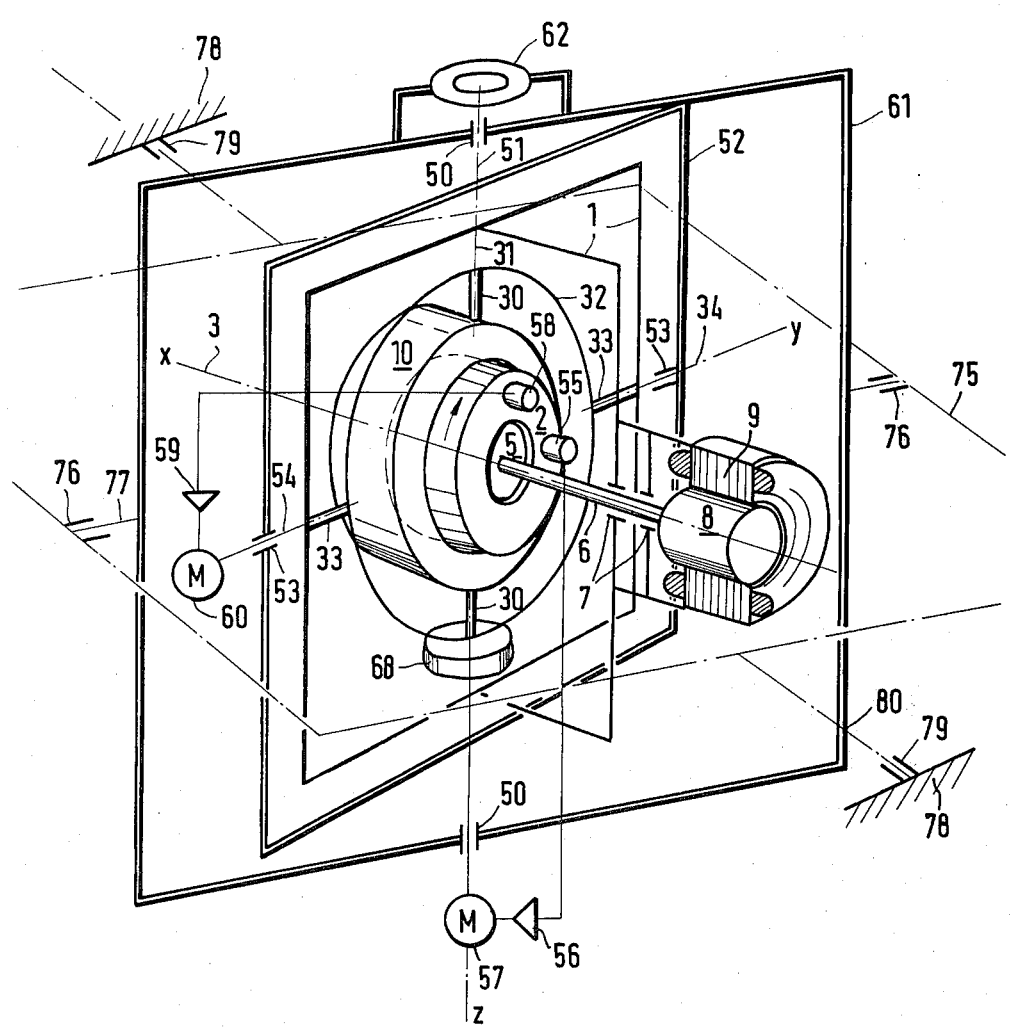
FIG. 5 is a schematic perspective view of a gyrocompass formed in accordance with the invention.

The construction in FIG. 5 is suitable for use as a gyro-compass. (Reference numerals which are the same as the reference numerals in FIGS. 1, 3 and 4 have the same meaning as there).

The gyroscope is constructed in principle as shown in FIG. 1 with the magnetic ring 10 suspended to be resilient in rotation about two axes as shown in FIG. 3 and with the drive axis 3 horizontal. The rotary resilient suspension on axis 34 (the y axis) may also be replaced by some other kind of mounting of low moment.

The gyro-frame 1 is mounted to rotate in the frame 61 of the apparatus about an azimuth axis 51 and an "east-west" axis 54 whose mean position is horizontal by means of an intermediate frame 52 and bearings 50, 53 and is continuously caused to follow the gyro-rotor 2 in a known fashion by means of servo motors 56, 59 by angle pick-offs 55, 58 for the angular position of the rotor 2 relative to the gyro-frame 1. Thus the position of the gyro-frame 1 relative to the z and y axes represents the position of the gyro-rotor 2. It can be detected relative to the azimuth axis 51 in relation to the frame 61 of the apparatus and transmitted to remote points by an angle pick-off 62 of known construction. Instead of or in addition to the angle pick-off 62, the azimuth position of the gyro-frame 1 relative to the frame 61 of the apparatus may be indicated visually by a scale or compass rose which is not shown in FIG. 5.

When the compass is in the steadied state, the drive axis 3 points in a direction which differs from the meridian direction only by virtue of faults inherent in the system. The angle pick-off 62 and/or a rose fitted in place of it thus indicates, in principle, the azimuth position of the frame 61 of the apparatus in relation to the meridian direction. If the frame of the apparatus 61 is installed in a vehicle or craft in such a way that that a line normal to its plane as shown in the drawing extends parallel to the longitudinal axis of the vehicle or craft, the angle pick-off and the rose give the course of the vehicle relative to the meridian.

To permit the compass to function properly on moving vehicles or craft, which calls for the plane defined by the axes 3 and 31 to take up a sufficiently vertical average position, the frame 61 of the apparatus is generally pendulum mounted in the structure of the vehicle (indicated by 78 in this case) by a universal suspension which has a gimbal 75 and universal mounting shafts 77 and 80 which rotate in bearings 76, 79. In conventional compass systems the shaft 80 lies parallel to the longitudinal axis of the vehicle.

To achieve the compass action the magnetic ring 10 is coupled to the vertical with a coupling factor of $l_y$ by a bottom weight 68.

In this arrangement the gyro precession is described not by the equations (1) and (2) but by the equations $$\omega_z = -\frac{l_y}{H} \frac{\epsilon}{1 + \frac{d_x(l_y + d_y)}{K_w^2}} \quad (12)$$

$$\omega_y = -\frac{d_z}{K} \frac{l_y}{H} \frac{\epsilon}{1 + \frac{d_x(l_y + d_y)}{K_w^2}} \quad (13)$$

In these $\epsilon$ is the inclination of the axis of angular momentum of the rotor 2 relative to the horizontal.

By making the parameters ly, dz, Kw, H and dy of the appropriate size, the compass characteristics may be adjusted as desired, these being characterised essentially by the natural undamped oscillations and by the amount of Lehr damping D on the actual natural oscillations. Because of the resilient rotary constraint on the magnetic ring 10 about the axis 31 with a stiffness $d_z$ in rotation, it is notable that an elevation $\epsilon$ of the vector axis, despite the effect of the weight 68 at the bottom, which is only relative to the horizontal axis 34, also generates a moment about the vertical precession axis of the rotor 1 and thus a rate of procession $\omega_y$. In the example of a compass which is presently being described, this vertical moment is used in a known way to damp natural oscillations. In principle such a damping moment may also be generated or influenced by an eccentricity in the centre of gravity of the magnet ring 10 in the direction of the y axis.

The relationship between the parameters ly, dx, Kw, H and dy and the compass characteristics are defined by the equations:

$$\left| \frac{\epsilon}{\omega_z} \right| = \frac{T_o^2}{4\pi^2} \omega_E \cos \lambda \quad (14)$$

and $$\left| \frac{\epsilon}{\omega_y} \right| = \frac{T_o}{4\pi D} \quad (15)$$

in which $\lambda$ is the geographical latitude and $\omega_E$ is the earth's rate of rotation, together with equations (12) and (13). By combination, two equations suitable for calculating the parameters can be obtained.

$$\frac{H}{d_z} = \left( \frac{\pi}{DT_o\omega_E \cos \lambda} \right)^2 \frac{\frac{T_o^2}{4\pi^2} \omega_E \cos \lambda - \frac{H}{l_y}}{1 + \frac{d_y}{l_y}} \quad (16)$$

and $$\frac{H}{K_w} = \frac{DT_o \omega_E \cos \lambda}{\pi} \frac{H}{d_z} \quad (17)$$

Working out the equations with $\lambda=45°$, $T_o=80$ minutes, and $D=0.7$ and with the y axis resiliently mounted with $d_y/l_y=0.1$, gives perfectly feasible values of $H/d_y=26s$, $H/d_z=360s$ and $H/K_w=20s$.

Such a compass is subject to a latitude and damping dependent error in indicating the meridan direction.

$$\Delta \alpha_y = 4\pi \frac{D}{T_o} \omega_E \sin \lambda \quad (18)$$

which has to be allowed for in evaluating the azimuth signal present at pick-off 62 or which, as by known methods for example, has to be compensated for by an axial imbalance of the magnetic ring of mass m and eccentricity $e_x$ $$me_x = -\left( 1 + \frac{d_z(l_y + d_y)}{K_w^2} \right) \frac{H\omega_E \sin \lambda}{g} \quad (19)$$

in which g is the acceleration caused by gravity.

When used on a moving vehicle or craft such a compass is subject to cross-coupling errors of various kinds as a result of the interaction of alternating accelerations of the same frequency in the direction of the x, y, and z axes, the dominant one of which is know in compass technology as the "Intercardinal rolling error". It can be avoided by for example stabilising the frame 61 of the apparatus in a known fashion so that the axis 51 remains sufficiently vertical under all movements of the vehicle or craft. Another possibility is to damp the oscillations of the ring 32, which is pendulous, about the axis 34, e.g. by means of an eddy-current damping arrangement which is similar to that consisting of component 65 and 67 in FIG. 4 or by a viscous damping arrangement.

Since the methods of suppressing the roll error are not relevant to the invention and the compass is able to operate without such suppression under conditions of limited movement and limited accuracy, they will not be discussed further here.

What I claim is:

1. In a gyroscopic instrument, the combination comprising a frame, a gyroscope rotor including a co-axial drum-shaped sleeve of a non-magnetic and electrically conductive material, means for mounting said rotor within said frame for rotation and for universal pivotal movement about axes intersecting the axis of rotation of said rotor, a magnetic device having outer magnetic pole means, inner magnetic pole means surrounded thereby and a gap therebetween, the field lines produced by said pole means extending transversely through said gap, means on said frame and on said magnetic device for so mounting said magnetic device non-rotatably as to locate said sleeve within said air gap with a radial clearance affording said sleeve pivotal movability relative to said magnetic device about said axes, and driving means carried by said frame and connected to said rotor whereby rotation of said gyroscopic rotor causes said magnetic device to induce eddy currents in said sleeve producing electro-motive forces and a resultant tendency of said rotor, in event of a deviation of the rotor axis from the axis of said magnetic device, to perform a precessional motion eliminating said deviation, the gap of said magnetic device being confined by a pair of evenly spaced opposed annular cylindrical faces of said pole means, the width of said faces being smaller than the axial length of said sleeve, both ends of said sleeve projecting out of said gap, said magnetic device being of a type producing in said gap a magnetic field of circumferentially uniform strength between said opposed annular faces, said magnetic field being normally located symmetrically with respect to a median plane extending transversely of said gyroscope rotor, said plane containing the point of intersection of said axes about which said universal pivotal movement takes place.

2. The combination claimed in claim 1 in which said magnetic device and said sleeve are so dimensioned that said magnetic field extends across a fraction only of the axial length of said sleeve.

3. The combination claimed in claim 1 in which said means for mounting said rotor comprises a shaft journalled in said frame and a universal joint connecting said rotor to said shaft, said sleeve and said magnetic device surrounding said universal joint.

4. In a gyroscopic instrument for measuring the velocity of its rotation about a pair of intersecting axes, the combination claimed in claim 3 in which said magnetic device is rigidly mounted on said frame in such a location that the axis of said magnetic device magnet coincides with the axis of said shaft.

5. In a gyroscopic instrument for integrating pivotal motion about a single axis, the combination claimed in claim 1 in which said means on said frame and on said magnetic device form a pivotal connection affording pivotal movability of said magnetic device relative to said frame about a pivot axis intersecting the axis of rotation of said rotor at right angles.

6. The combination claimed in claim 5 in which said means for mounting said gyroscopic rotor on said frame comprises a shaft journalled in said frame and a universal joint connecting said gyroscopic rotor to said shaft, said means on said frame and on said magnetic device constituting a pivotal connection affording said magnetic device pivotal movability relative to said frame about a pivot axis extending at right angles to said shaft through the center of said universal joint.

7. In a gyroscopic instrument, the combination claimed in claim 1 in which said means for mounting said gyroscopic rotor on said frame comprises a shaft journalled in said frame and a universal joint connecting said rotor to said shaft, said means on said frame and on said magnetic device forming a pivotal connection affording said magnetic device pivotal movability relative to that frame about at least two axes extending at right angles to each other, one of said axes extending at right angles to said shaft.

8. In a gyroscopic instrument the combination claimed in claim 7 in which said axes extend through the center of said universal joint.

9. In a gyroscopic instrument the combination claimed in claim 7 further comprising means on said frame for controlling the relative angular position of said magnetic device to said frame about at least one of said axes.

10. In a gyroscopic instrument, the combination claimed in claim 1 in which said means on said frame and on said magnetic magnet is a universal pivotal mounting means affording universal pivotal movability of said magnetic device relative to said frame, said combination further comprising servo motor means connected to said universal pivotal mounting means and to said magnetic device, sensing means co-ordinated to said frame and to said gyroscopic rotor for sensing the relative position of the axes of said rotor and of said magnet device and for controlling said servo motor means in a manner causing said magnetic device to enforce precessional motion of said gyroscopic rotor resulting in restoration of said rotor and said magnetic device to co-axial relationship, and gravitational means connected to said magnetic device to hold the axis of said magnet in vertical position.

11. In a gyroscopic instrument the combination claimed in claim 1 further comprising mounting means on said magnetic device and on said frame for non-rotatably mounting said magnetic device for pivotal displacement relative to said frame about pivot axes intersecting said axis of rotation, and resilient means connected to said magnetic device and said mounting means to restore said magnet to a normal relationship to said frame.

12. The combination claimed in claim 11 in which said resilient means are flexure joints.

13. The combination claimed in claim 1 in which said sleeve projects from said rotor in opposite directions, said magnetic device surrounding both projecting ends of said sleeve.

14. The combination claimed in claim 11 further comprising dampening means connected to said mounting means for dampening said displacement.

15. The combination claimed in claim 1 in which said magnetic device is composed of a pair of U-profiled permanent annular magnet elements and of means connected thereto and holding said elements in spaced nested relationship with the arms of the U-profiles being in opposed relationship with gaps between them.

* * * * *